US012695748B2

(12) United States Patent
Oichman et al.

(10) Patent No.: US 12,695,748 B2
(45) Date of Patent: Jul. 28, 2026

(54) METHOD FOR CONTROLLING SECURE ACCESS TO DATA IN A HYBRID-CLOUD ENVIRONMENT

(71) Applicant: Varonis Systems, Inc., Miami, FL (US)

(72) Inventors: Ran Oichman, Cary, NC (US); Nimrod Zimerman, Even Yehuda (IL)

(73) Assignee: Varonis Systems, Inc., Miami, FL (US)

( * ) Notice: Subject to any disclaimer, the term of this patent is extended or adjusted under 35 U.S.C. 154(b) by 145 days.

(21) Appl. No.: 18/436,730

(22) Filed: Feb. 8, 2024

(65) Prior Publication Data
US 2025/0260690 A1 Aug. 14, 2025

(51) Int. Cl.
H04L 9/40 (2022.01)
(52) U.S. Cl.
CPC ...... H04L 63/0884 (2013.01); H04L 63/0876 (2013.01); H04L 63/104 (2013.01)
(58) Field of Classification Search
CPC . H04L 63/0884; H04L 63/0876; H04L 63/10; H04L 63/04
See application file for complete search history.

(56) References Cited

U.S. PATENT DOCUMENTS

2014/0245417 A1 8/2014 Hu et al.
2019/0028485 A1* 1/2019 Baird .................... H04L 67/146

2019/0103968 A1 4/2019 Srinivasan et al.
2021/0044587 A1 2/2021 Otsuka
2022/0103517 A1* 3/2022 Luotojärvi .......... H04L 63/0876
2024/0338471 A1* 10/2024 Agrawal ............. G06F 21/6218

FOREIGN PATENT DOCUMENTS

EP 3585026 A1 12/2019
JP 2020014071 A 1/2020
WO 2021101888 A1 5/2021
WO 2023212309 A1 11/2023

* cited by examiner

*Primary Examiner* — Khoi V Le
(74) *Attorney, Agent, or Firm* — COATS & BENNETT, PLLC

(57) ABSTRACT

A method is provided for controlling secure access to data in hybrid-cloud environments. A trusted authorisation server controls access to data served by a resource server to client devices in an untrusted environment, to ensure client devices are only able to access data that they are permitted to access. In the present techniques, the trusted authorisation server checks the validity of data access requests received from client devices prior to any such requests being received by the resource server or an authorisation server associated with the resource server. This is advantageous because in many existing hybrid-cloud systems, the resource server and authorisation server are unable to check the individual validity of requests received from client devices. This is particularly problematic for multi-tenant resource servers. The present techniques provide a more secure way of controlling access to data stored and served by cloud-based, off-premises/third party resource servers.

18 Claims, 4 Drawing Sheets

Method Performed by Trusted Authorisation Server 32

Method Performed by Identity Server 34

1

METHOD FOR CONTROLLING SECURE ACCESS TO DATA IN A HYBRID-CLOUD ENVIRONMENT

FIELD

The present application generally relates to a method for controlling secure access to data in hybrid-cloud environments. In particular, the present application provides a trusted authorisation server for controlling access to data served by a resource server to client devices in an untrusted environment, to ensure client devices are only able to access data that they are permitted to access.

BACKGROUND

In traditional client-server authentication frameworks, a client device requests access to an access-restricted resource (such as an item of data), which is stored on a server. The server authenticates the client device to determine whether to serve the access-restricted resource to the client device. The access-restricted resource may be owned by the client/client device itself. In some cases, the access-restricted resource may be owned by another entity, which permits access to one or more client devices. For example, a company may own data items which need to be accessed by some or all of their employees via the employees' client devices. The company would grant permission to some or all of the client devices to access the company's access-restricted resources.

OAuth 2.0 is an industry-standard protocol for performing authorisation in such client-server systems. The protocol defines four roles: resource owner; resource server; client; and authorisation server. The resource owner is an entity capable of granting access to a protected or access-restricted resource. For example, the resource owner may be a company (e.g. Company A). The resource server is a server which hosts/stores the access-restricted resources, and is capable of accepting and responding to requests, received from client devices, for access to access-restricted resources. For example, the resource server may be a third-party server rather than a server owned and run by the resource owner. The resource server may therefore store the access-restricted resources for Company A. In some cases, the resource server may store access-restricted resources for multiple resource servers, such as Company A and Company B. In this case, it is even more important that client devices are only able to access access-restricted resources for which they have permission. The client device is any device running any application that makes access requests to the server. The authorisation server is a server, linked to the resource server, which issues access tokens to client devices that are making requests for access-restricted resources.

However, there are some implementations of OAuth 2.0 which can lead to data security risks. In particular, when a resource server stores access-restricted resources for different resource owners, or for different groups of client device/end user, there is a risk that a client device is able to access resources which it is not permitted to access in a multi-tenant environment.

The present applicant has therefore recognised the need for an improved method of controlling access to access-restricted resources on a resource server.

SUMMARY

In a first approach of the present techniques, there is provided a computer-implemented method, performed by a trusted authorisation server in a hybrid-cloud environment, for controlling secure access to data provided by a third party resource server to multiple client devices in the hybrid-cloud environment, the method comprising: receiving, from a client device in the hybrid-cloud environment, a first request for an access token to access at least one data item associated with the client device, where the at least one data item is stored on and provided by the third party resource server; determining whether the received first request is valid; transmitting, when the received first request is determined to be valid, a second request for an access token to a third party authorisation server that is linked to the resource server, where the second request includes at least one identifier for the client device; receiving, from the third party authorisation server, an access token specifically for the client device which made the first request, the access token containing the at least one identifier included in the second request; and transmitting, to the client device, the received access token for use to access the at least one data item stored on and provided by the resource server.

The term "hybrid-cloud environment" used herein means a mixed computing environment, in which applications are run in different environments, including public cloud servers, private cloud servers, on-site servers and edge or end user devices. Hybrid-cloud environments are typically used to enable businesses or organisations to scale capacity (e.g. processing capacity and/or storage capacity) up or down as required, thereby avoiding the need to purchase new servers that may not always be needed. In such hybrid-cloud environments, the above-mentioned OAuth 2.0 (or higher) protocol is often used to enable resource owners to store data on a resource server, and to enable client devices to access data from the resource server when required.

As explained above, in existing systems, a client device requests and receives access tokens directly from the third party authorisation server. However, because the client devices are untrusted, and the third party authorisation server does not (and may not have the ability to) check the validity of requests received from the client devices, it is possible for the third party authorisation server to provide access tokens to client devices for data that the client devices are not permitted to access. For example, if a client device A from Company A sends a request to the third party authorisation server, where the request includes the client device A's identifier, the third party authorisation server returns an access token containing that identifier. However, in another example, if the client device A from Company A sends a request to the third party authorisation server, where the request includes client device B's identifier, the third party authorisation server returns an access token containing that identifier. This means that client device A is able to access data meant for client device B. This problem arises because the third party authorisation server cannot distinguish between client device A and client device B.

Generally speaking, in a multi-tenant OAuth system, the authorisation server allows multiple tenants to access resources, using a single set of security credentials. The security credentials (e.g. a private key or secret) are those which are used by client devices of each tenant to authenticate themselves to the authorisation server. Since the same credentials are used by all tenants, this means that client device A could use these credentials to obtain access to client device B's data/resources, for example. This is the key weakness in many existing multi-tenant OAuth application implementations.

Advantageously, the present techniques provide a trusted authorisation server, which is positioned between the client devices (that are in an untrusted environment) and the third party resource server and authorisation server. The present trusted authorisation server is arranged to check the validity of requests received from client devices, and to only forward valid requests to the third party authorisation server. This means that the above-mentioned example scenario, where client device A uses client device B's identifier, cannot result in an access token being sent to client device A, because the present trusted authorisation server would determine that the request is invalid. Thus, the present techniques provide a more secure way to control who has or can access data stored and served by a resource server.

In some cases, the method may be for controlling secure access to data provided by the third party resource server to multiple client devices in a multi-tenant environment. The term "multi-tenant environment" is used herein to mean that a single instance of software runs on a server which serves multiple user groups. Each user group is a "tenant", which shares a common access to the software and specific privileges. In one example, the server may be a resource server which stores data owned by multiple resource owners. Each resource owner may specify a tenant which is able to access their data only. There is a need in such an environment to ensure that tenants can only access the data they have permission to access. For example, tenant A should not be able to access tenant B's data, and vice versa.

In a multi-tenant environment, the step of receiving the first request from the client device may comprise receiving the first request from a client device associated with a tenant of a plurality of tenants. Thus, for example, the client device may belong to tenant A, and tenants A, B, C and so on, may all use the same third party resource server. In this environment, the step of receiving an access token may comprise receiving an access token specifically for the client device associated with the tenant.

Preferably, therefore, the step of transmitting the second request for an access token to a third party authorisation server may comprise transmitting a tenant identifier for the client device. Thus, the trusted authorisation server may include at least the tenant identifier associated with the client device when sending the second request for an access token. This enables the third party authorisation server to issue an access token that is specifically for the client device, because the access token contains at least the tenant identifier. This is advantageous over the existing techniques because the access token is only issued after the trusted authorisation server has checked the validity of the first request. In other words, if the trusted authorisation server determines that the first request is invalid, the whole process terminates and no access token is issued. The trusted authorisation server only transmits the second request when the first request is valid, and provides the identifier(s) associated with the client device when sending the second request.

In some cases, each tenant may be divided into organisational units (OUs). For example, in the case where Company A is a tenant, Company A may be divided into different organisational units, such as the Human Resources department, IT department, Finance department, Engineering department, Legal department, and so on. Each organisational unit may not be permitted to access other organisational units' data. This means that knowing which organisational unit each client device belongs to is important when checking the validity of the first request and issuing the access token.

Therefore, the step of receiving the first request from a client device associated with a tenant may comprise receiving the first request from a client device in an organisational unit of a plurality of organisational units within the tenant. Similarly, the step of receiving an access token may comprise receiving an access token specifically for the client device in the organisational unit within the tenant.

To ensure that client devices in organisational units are only granted access tokens for data that the organisational unit is permitted to access, the step of transmitting the second request for an access token to a third party authorisation server may comprise transmitting one or more of a tenant identifier and an organisational unit identifier for the client device. This is so that the access token is issued for the specific client device which made the first request.

The trusted authorisation server may check the validity of the first request in any suitable manner. In one example, the trusted authorisation server may store, or have access to, a database of all client devices which run software that needs to communicate with the resource server.

For instance, client devices may use an email client/ application which needs to communicate with the resource server whenever the email client/application is being used. The email client software may be installed on each client device belonging to a tenant, and the tenant may then have a record of each client device which will be accessing the resource server. This information may be provided to, or automatically obtained by, the trusted authorisation server and stored in a database. In other words, as tenants own client devices, each tenant has a record of each client device that is to access the resource server, together with a client device identifier. In cases where a tenant is divided into organisational units, each client device will also be assigned, by the tenant, to one or more organisational units. This information may also be provided to, or obtained by, the trusted authorisation server and stored in the database.

The database may also store, for each client device, a public key which corresponds to a private key on the client device. The public-private key pair may be used by the trusted authorisation server to check the identity of the client device which has sent the first request.

The or each identifier associated with each client device, and stored in the database, may be configured at deployment time by a global admin, or could be automatically inferred by the identity of the personnel deploying the client. For example, if an employee belongs to an OU, so does the client that employee is using.

The database containing the identifiers may be stored by, and used directly by, the trusted authorisation server. In this case, the trusted authorisation server may retrieve information from the stored database itself and use this to check the validity of the first request. Furthermore, the trusted authorisation server may retrieve one or more identifiers from the database for use when transmitting the second request to the third party authorisation server.

Alternatively, the database may be stored by a trusted identity server, which is linked to the trusted authorisation server and is in the same trusted environment. In this case, the trusted authorisation server may request the identity server to check the validity of the first request. The identity server may transmit one of two possible responses to the request back to the trusted authorisation server.

One possible response is that the first request is not valid. This may be the response when the first request is received from an unknown client device, which has no corresponding information in the stored database. Similarly, this may be the response when the first request is for data that the client device is not permitted to access, based on the identifier(s) associated with the client device.

Another possible response that the first request is valid. This may be the response when the client device's identity can be verified using the information in the stored database, and when the first request is for data that the client device is permitted to access, based on the identifier(s) associated with the client device. Furthermore, the identity server may transmit one or more client device identifiers from the database to the trusted authorisation server, so that the identifiers can be used when transmitting the second request to the third party authorisation server.

Thus, in some cases the step of determining whether the received request is valid may comprise: transmitting the received first request to an identity server, the identity server configured to check validity of the received first request using information about the client device; and receiving, from the identity server, a response indicating that the received request is valid and the at least one identifier for the client device.

The at least one identifier for the client device, which is stored in the database, may comprise any one or more of: a client device identifier; a tenant identifier; and an organisational unit identifier. To enable the validity of the first request to be determined, the at least one identifier is associated with the client device in some way. For example, as mentioned above, the association may be via a private-public key-pair. In this example, the public key for each client device may also be stored in the database.

In a second approach of the present techniques, there is provided a system for controlling secure access to data provided by a third party resource server to multiple client devices in a hybrid-cloud environment, the system comprising: a third party resource server storing a plurality of data items; a third party authorisation server linked to the third party resource server; a plurality of client devices; and a trusted authorisation server configured to: receive, from a client device of the plurality of client devices in the hybrid-cloud environment, a first request for an access token to access at least one data item associated with the client device, where the at least one data item is stored on and provided by the third party resource server; determine whether the received first request is valid; transmit, when the received first request is determined to be valid, a second request for an access token to the third party authorisation server, where the second request includes at least one identifier for the client device; receive, from the third party authorisation server, an access token specifically for the client device which made the first request, the access token containing the at least one identifier included in the second request; and transmit, to the client device, the received access token for use to access the at least one data item stored on and provided by the resource server.

The features described above with respect to the first approach apply equally to the second approach and, for the sake of conciseness, are not repeated.

The multiple client devices may be arranged in a multi-tenant environment.

As explained above, once the trusted authorisation server has determined the validity of the first request, the trusted authorisation server transmits a second request for an access token to the third party authorisation server. The second request includes at least one identifier of the client device which made the first request, which ensures the third party authorisation server issues an access token that can only be used by a client device having the same at least one identifier. In some cases, the second request may simply include a client identifier.

When the multiple client devices are arranged in a multi-tenant environment, each client device may comprise a tenant identifier indicating which tenant the client device belongs to. Therefore, the third party authorisation server may be configured to: receive the second request for an access token from the trusted authorisation server, wherein the second request comprises a tenant identifier for the client device that transmitted the first request; and transmit to the trusted authorisation server an access token specifically for the client device with the tenant identifier, the access token containing the tenant identifier included in the second request.

The multiple client devices may be arranged in organisational units within tenants of the multi-tenant environment, as explained above. When the multiple client devices are arranged in organisational units, each client device may comprise an organisational unit identifier indicating which organisational unit the client device belongs to. Thus, the third party authorisation server may be configured to: receive the second request for an access token from the trusted authorisation server, wherein the second request comprises an organisational unit identifier for the client device that transmitted the first request; and transmit to the trusted authorisation server an access token specifically for the client device with the organisational unit identifier, the access token containing the organisational unit identifier included in the second request.

The access tokens issued by the third party authorisation server may not have any particular format. For example, systems using OAuth protocols may use any format for the access tokens. Typically, however, an access token is a string that client devices use to make requests to the resource server. The access token issued by the third party authorisation server may contain information about the token type, information about the client device (e.g. the identifier(s) of the client device) and what data is being requested, and a signature which is applied by the third party authorisation server. The signature is used by the resource server to determine the authenticity of access tokens received from client devices. If the signature is missing or is not authentic, then the resource server will not permit the client device to access data. Access tokens may also include an expiry data or time.

Advantageously, in the present techniques, the access tokens issued by the third party authorisation server are only issued when the trusted authorisation server has checked the validity of the first request and the identity of the client device making the first request. This means that the access tokens are specific to the client device that made the first request but crucially, are only issued after the validity and identity checks have been completed (and are positive). This ensures that access tokens are only granted to client devices known to the trusted authorisation server, and which are requesting access to data that they are permitted to access.

As explained above, the or each identifier associated with each client device may be stored in a database, and this database may be used by the trusted authorisation server to determine the validity of the first request.

In some cases, the trusted authorisation server may store this database and may have the capability to directly determine the validity of the first request. That is, the database containing the identifiers may be stored by, and used directly by, the trusted authorisation server. In this case, the trusted authorisation server may retrieve information from the stored database itself and use this to check the validity of the first request. Furthermore, the trusted authorisation server may retrieve one or more identifiers from the database for use when transmitting the second request to the third party authorisation server.

In other cases, the system may further comprise an identity server configured to check validity of the received first request using information about the client device. In such cases, the identity server stores the database containing the identifiers, and the trusted authorisation server may request the identity server to check the validity of the first request. The identity server may transmit one of two possible responses to the request back to the trusted authorisation server.

One possible response is that the first request is not valid. This may be the response when the first request is received from an unknown client device, which has no corresponding information in the stored database. Similarly, this may be the response when the first request is for data that the client device is not permitted to access, based on the identifier(s) associated with the client device.

Another possible response that the first request is valid. This may be the response when the client device's identity can be verified using the information in the stored database, and when the first request is for data that the client device is permitted to access, based on the identifier(s) associated with the client device. Furthermore, the identity server may transmit one or more client device identifiers from the database to the trusted authorisation server, so that the identifiers can be used when transmitting the second request to the third party authorisation server.

Thus, the trusted authorisation server may determine whether the received request is valid by: transmitting the received first request to the identity server; and receiving, from the identity server, a response indicating that the received request is valid and the at least one identifier for the client device.

The client device which transmitted the first request may be configured to: receive, from the trusted authorisation server, an access token; transmit, to the third party resource server, a request to access at least one data item together with the received access token; and receive, from the third party resource server, the requested at least one data item. Firstly, the client device only receives the access token in the case when the first request is determined to be valid. Secondly, the access token is specific to that client device (as it contains the client device identifier(s)), and is specific to the data item(s) specified in the first request. This means the client device is only able to access the data item(s) originally requested in the first request. New requests would need to be made by the client device for any other data item(s).

As noted above, the access token comprises a signature of the third party authorisation server. This signature is used by the third party resource server to determine the authenticity of the access token, prior to serving the requested data item(s). Thus, the third party resource server may be configured to: receive, from the client device, a request to access at least one data item together with the access token; determine whether the request to access at least one data item is authentic; and transmit, to the client device, the requested at least one data item when the request is determined to be authentic. The third party resource server may also perform further checks (itself, or via the third party authorisation server) to determine whether the access token is valid. For example, the third party resource server may check whether the access token has not expired.

The third party resource server may determine whether the request to access at least one data item is authentic by: transmitting the received access token to the third party authorisation server; and receiving, from the third party authorisation server, a response indicating that the received access token is authentic. The third party authorisation server may check the authenticity of the signature on the access token, for example.

Each data item of the plurality of data items stored by the third party resource server may be tagged with information indicating any one or more of: one or more client devices permitted access; one or more organisational units permitted access; and one or more tenants permitted access. This may help the resource server to determine what data to serve to a client device.

Preferably, the third party resource server transmits the requested at least one data item when the at least one identifier contained in the access token matches the information tagged to the requested at least one data item. In other words, the third party resource server may perform another check before serving any data to the client device. This additional check is to ensure that the client device is allowed to access the requested data item(s). This check cannot be performed by the trusted authorisation server, because the trusted authorisation server is not aware of any data item specific restrictions/permissions. The trusted authorisation server is only able to check whether the client device is making a request for data item(s) associated with the client device, tenant and/or organisational unit. However, a resource owner may have placed additional restrictions on individual data item(s). For example, if a client device is being used by an employee in a Human Resources department of Company A, the trusted authorisation server can check the client device identifier, organisational unit identifier (for the HR department) and/or tenant identifier (for Company A). The resource owner may wish for that employee to have access to data item(s) associated with the department of Company A, but not all data item(s). For example, an HR Manager may not want other members of the HR department to see all employee salary information. Thus, some data item(s) may be further restricted, via tags or metadata appended to the data items stored by the resource server. Such tags/metadata may include these further restrictions. For example, a tag may indicate that access permission is not granted to certain client device identifiers.

In some cases, the third party resource server may be a Microsoft Azure resource server. Microsoft Azure is often used by companies (tenants) to store data for Microsoft 365 services. There is a desire to use Microsoft Azure as a resource server in multi-tenant environments, because this is recommended by Microsoft to customers, it is easy to set-up, control and configure centrally, and is easy to alter security credentials to avoid, or in case of, security breaches. However, as explained in more detail below, the current Microsoft Azure system contains a specific security and privacy issue which arises in a particular circumstance.

The third party resource server and third party authorisation server may operate using an OAuth protocol, such as, but not limited to, OAuth 2.0, OAuth 2.1, etc.

In a related approach of the present techniques, there is provided a computer-readable storage medium comprising instructions which, when executed by a processor, causes the processor to carry out any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

BRIEF DESCRIPTION OF THE DRAWINGS

Implementations of the present techniques will now be described, by way of example only, with reference to the accompanying drawings, in which.

DETAILED DESCRIPTION OF THE DRAWINGS

Broadly speaking, the present techniques provide a method for controlling secure access to data in hybrid-cloud environments. In particular, the present techniques provide a trusted authorisation server for controlling access to data served by a resource server to client devices in an untrusted environment, to ensure client devices are only able to access data that they are permitted to access. In the present techniques, the trusted authorisation server checks the validity of data access requests received from client devices prior to any such requests being received by the resource server or an authorisation server associated with the resource server. This is advantageous because in many existing hybrid-cloud systems, the resource server and authorisation server are unable to check the individual validity of requests received from client devices. Rather, in many existing systems, access tokens for some data may be accidentally granted to client devices that should not have access to that data. This is particularly problematic for multi-tenant resource servers. The present techniques provide a more secure way of controlling access to data stored and served by cloud-based, off-premises/third party resource servers.

Figure 1:
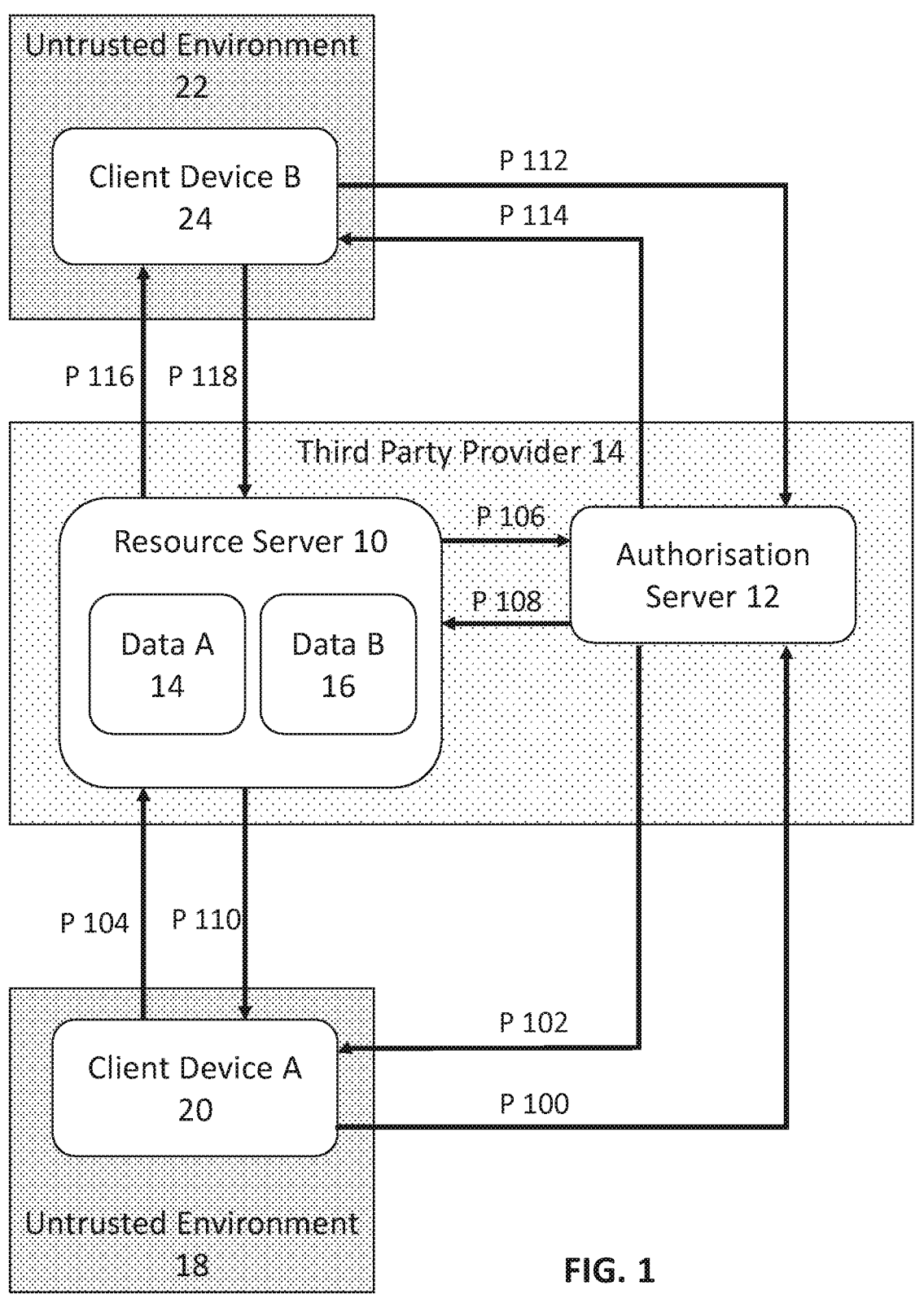
FIG. 1 is a block diagram of existing techniques for controlling access to data in hybrid-cloud environments.

The problem associated with existing hybrid-cloud systems is now explained in more detail with reference to FIG. 1. FIG. 1 is a block diagram of existing techniques for controlling access to data in hybrid-cloud environments. The system comprises on-premises entities, and off-premises entities. That is, some components/entities of the system may be owned by a specific owner (e.g. a company or business). In this case, client devices 20, 24 may be owned by one or more specific companies. Furthermore, other components/entities of the system may be owned by a different owner (e.g. a third party). In this case, the resource server 10 and authorisation server 12 may be owned by a third party provider 14, such as, but not limited to Microsoft. This hybrid-cloud environment is typically used to enable businesses or organisations to scale capacity (e.g. processing capacity and/or storage capacity) up or down as required, thereby avoiding the need to purchase new servers that may not always be needed. In such hybrid-cloud environments, the above-mentioned OAuth 2.0 (or higher) protocol is often used to enable resource owners to store data on a resource server, and to enable client devices to access data from the resource server when required.

As shown in FIG. 1, in existing systems, a specific company (for example) may own a number of client devices. Two client devices are shown here for the sake of simplicity, but it will be understood that a company may own tens, hundreds, thousands, etc. of client devices. In the example of FIG. 1, client device A 20 belongs to Company A, and is in an untrusted environment 18 of Company A. Here, the term "untrusted environment" is used to mean that the environment of a tenant that is able to make any request to an authorisation server, including any malicious requests. For example, the client device may be able to connect to unsecure Internet connections or to compromised networks. Similarly, client device B 24 belongs to Company B, and is in an untrusted environment 22 of Company B.

Both Company A and Company B have decided to use a resource server 10 that is owned by a third party provider 14, for the reasons mentioned above. The resource server 10 stores resources (e.g. restricted access data items). Thus, data A 14 belongs to Company A (resource owner), and data B 16 belongs to Company B (resource owner). Data A 14 and data B 16 are saved on resource server 10. The resource server 10 functions to serve the data to any requesting client devices. The resource server 10 should serve data A only to client devices A, and data B only to client devices B.

The resource server 10 is connected to an authorisation server 12, which is also provided by the third party provider 14. The authorisation server 12 functions to issue access tokens to client devices, where the access tokens enable the client devices to request access to data stored by the resource server.

As shown in FIG. 1, client device A 20 may make a request (step P 100) to the authorisation server 12 for an access token, so that the client device A 20 can access data A 14 stored on the resource server 10. The client device A 20 includes a tenant identifier when making the request, so that the authorisation server 12 can check that the client device A 20 belongs to a known tenant (i.e. to a company that is known to be using the resource server 10). For example, client device A 20 may include a tenant identifier for Company A. The authorisation server 12 knows the tenant identifier for Company A, so if the request includes the same tenant identifier, the authorisation server 12 considers the request to be valid.

In response to the request being determined as valid, the authorisation server 12 issues and transmits an access token (step P 102) to client device A 20. However, the authorisation server 12 uses the same security credentials for all client devices and all tenants when issuing access tokens. That is, the security credentials are common to all tenants (and their client devices). The credentials are those which are used to authenticate to the authorisation server 12. For example, the credentials may be a secret or a private key (such as the client secret mentioned below). Generally speaking, in a multi-tenant OAuth system, the authorisation server allows multiple tenants to access resources, using a single set of credentials. This means that client device A could use these credentials to obtain access to client device B's data/resources, for example. This is the key weakness in many existing multi-tenant OAuth application implementations. An advantage of the present techniques is that the client device does not need to know or rely on the security credentials in order to authenticate itself. Instead, as explained below, the present trusted authorisation server holds the information needed for client devices to authenticate themselves.

The client device A 20 then transmits the received access token to the resource server 10 in order to access data A 14 (step P 104). The resource server 10 checks the authenticity of the access token, by communicating with the authorisation server 12. That is, the resource server 10 may transmit a request to authenticate the received access token to the authorisation server 12 (step P 106), and may receive a response from the authorisation server 12 (step P 108). When the response is positive (i.e. the access token is confirmed as being authentic), then the resource server 10 serves the requested data A 14 to the client device A 20 (step P 110).

The same process applies to client device B 24 which belongs to Company B, and which needs to access data B 16. Thus, steps P 112 and P 114 for client device B 24 are the same as steps P 100 and P 102, and steps P116 and P118 for client device B 24 are the same as steps P104 and P 110.

If client device A 20 is in an untrusted environment 18, it is necessary to ensure that client device A is only able to access data A 14, and is not able to access data B 16. That is, client devices of one company/tenant should not be able to access data belonging to another company/tenant.

Similarly, in some cases, as explained above, each tenant may be divided into organisational units (OUs). For example, in the case where Company A is a tenant, Company A may be divided into different organisational units, such as the Human Resources department, IT department, Finance department, Engineering department, Legal department, and so on. (Thus, in FIG. 1, instead of client device A and B belonging to different companies, they could instead belong to different organisational units within the same company.) Each organisational unit may not be permitted to access other organisational units' data. This means that knowing which organisational unit each client device belongs to is important when checking the validity of the first request and issuing the access token. However, there is no mechanism to do this in the existing system shown in FIG. 1. That means that existing systems contain a security risk which enables client device A 20 to access data A 14 and data B 16, and similarly for client device B 24.

This risk arises because the authorisation server 12 does not check that a request received from a client device (e.g. a step P 100 or P112) is valid beyond checking that it relates to a known tenant. As noted above, when a client device transmits a request for an access token, the request includes a tenant identifier. However, client devices that are acting maliciously or that have become compromised could modify the request to include a different tenant identifier. That is, client device A 20 could be controlled to send requests that include Company B's tenant identifier instead of Company A's tenant identifier. Since the authorisation server 12 is only checking that the tenant identifier corresponds to tenant identifiers known to the authorisation server 12, the authorisation server 12 will grant the access token to client device A 20. This access token permits client device A 20 to access data B 16. Thus, Company B's data B 16 is no longer secure. These limitations generally prevent use of existing multi-tenant resource servers 10 and authorisation servers 12 in sensitive or untrusted environments, such as on-premises machines controlled by each tenant.

For example, resource server 10 may be a Microsoft Azure Graph API, which allows multiple tenants that use Microsoft 365 to access their Microsoft Exchange email inboxes. That is, Company A and Company B may both use the resource server 10 for email services, and each client device of each Company has to access the resource server 10 when sending and receiving emails, accessing their email address books, accessing their calendars, and so on. To do so, each client device includes their company's tenant identifier when making token requests to the Azure Authorization Server 12 "Get Token" endpoint. However, client device A 20 could modify the tenant identifier to get information of any other tenant.

For example, client device A 20 of Company A with tenant ID of 6de960de-e730-4dda-82a4-80b2d950925a, may transmit a token request to the authorisation server 12 of the following format:

https://login.microsoftonline.com/6de960de-e730-4dda-82a4-80b2d950925a/oauth2/v2.0/token?client_secret=zTc8Q~CEOMluQXxhFErXsv35vEZ.Ya827t Ypna-f& . . . (some fields are omitted for brevity).

However, client device A 20 could change this token request to instead point to Company B's tenant ID (1fa19cd6-047d-4d54-ad7a-678b28dbccdf). In this case, the token request transmitted to the authorisation server 12 by client device A 20 may be:

https://login.microsoftonline.com/1fa19cd6-047d-4d54-
ad7a-678b28dbccdf/oauth2/v2.0/token?client_secret=
zTc8Q~CEOMluQXxhFErXsv35vEZ.Ya827tYpna-
f& . . . .

With the access token returned from this call, client device A 20 could access sensitive e-mails of Company B. It will be understood that client device A 20 may be compromised by a malicious third party, or that Company A itself acts maliciously and purposefully causes all client devices A to use the wrong tenant identifiers.

As noted above, there are also circumstances in which a tenant may be divided into organisational units. Companies often require isolation between organisational units (OUs) within their tenant. Members of one OU should not be allowed to access data of another OU. There are many examples where this would be desirable, and the following are some non-limiting and non-exhaustive example scenarios: a law firm divided into branches where "Chinese walls", also known as "ethical walls" are in place to block sharing of information between the branches; and an army divided into different forces.

The data that may belong to an individual OU could be of any of the following, non-limiting and non-exhaustive types: User, Group, Role, Service Principal, App-Registration, Web Application, Site Collection, Site, Web, List, List Item, Content Type, Field, Folder, File, Mailbox, etc.

The same problem of isolation between tenants is observed between OUs. A member of one OU could modify request parameters and access data of another OU.

Generally speaking, single-tenant authorisation servers suffer from a few drawbacks. They need to create, securely store, distribute and periodically rotate through many different sets of credentials, just for the purpose of granting access to data, and because client devices accessing data are in untrusted environments. This has a higher chance of malfunctioning, as a failure in rotation of any credential will prevent access for a tenant. It also incurs higher development and maintenance costs, and may incur higher direct costs to the third party provider for multiple authorisation servers. Compromise of the credentials is hard to recover from, having to rotate all of them rapidly to prevent further damage. Multi-tenant authorisation servers mitigate these drawbacks, as they have only a single credential, and are therefore much more robust and simpler to develop and maintain. Compromise of the single credential is easy to recover from by rotating it. However, multi-tenant authorisation servers cannot be used as they stand in untrusted environments, due to the security and privacy issue described above. Therefore, there is a need to make multi-tenant systems more secure.

Furthermore, isolation between organisational units (OUs) is usually achieved by applying a filter when reading data from the resource server. Each resource is "tagged" upfront with an attribute signifying its OU, and the client filters out items not belonging to "its" OU. This of course is not secure- and relies on the client doing the filtering. Alternatively, another possible solution to both issues is to use a proxy. Here, a client accesses the multi-tenant resource server through a proxy, authentication done by the proxy, all data goes through the proxy. This suffers from significant network overhead and latency so is not practical in bandwidth-intensive use-cases.

Figure 2:
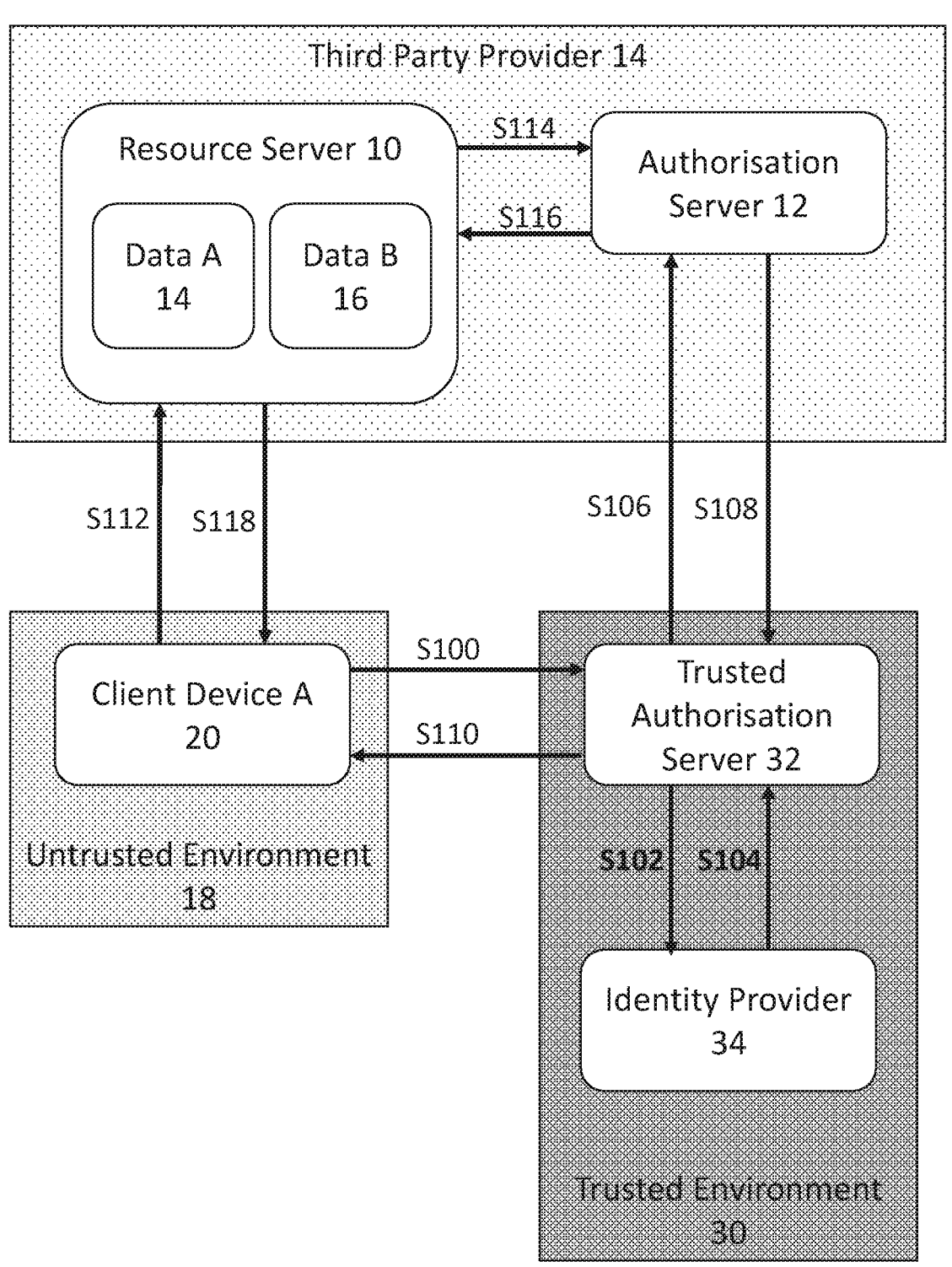
FIG. 2 is a block diagram of the present techniques for controlling secure access to data in hybrid-cloud environments.

A solution the above-described problems is now explained. FIG. 2 is a block diagram of the present techniques for controlling secure access to data in hybrid-cloud environments. The present techniques solve the above-mentioned problems by adding an intermediate trusted authorisation server 32, in a trusted environment 30, into the system. Furthermore, the present techniques add organisational unit awareness to the third party authorisation server and resource server. For the sake of simplicity, in FIG. 2 only a single client device is shown, but it will be understood that there are multiple client devices in the system. Furthermore, like reference numerals are used in FIG. 2 to denote components/entities shown in, and already described with respect to, FIG. 1.

In FIG. 2, client device A 20 is owned by Company A, and is located in untrusted environment 18. Company A uses a third party resource server 10 and authorisation server 12, as explained above with FIG. 1. As shown, the third party resource server 10 may be used to store data for multiple tenants (e.g. Company B) and/or for multiple organisational units of tenants.

Client device A 20 may transmit a request (step S100) to the authorisation server 12 for an access token, so that the client device A 20 can access data A 14 stored on the resource server 10. However, it can be seen that, in contrast to step P 100, here the client device A 20 is unable to directly communicate with authorisation server 12. Instead, the request transmitted by the client device A 20 is transmitted to, and received by, trusted authorisation server 32. This is advantageous because the trusted authorisation server 32 is able to check the validity of the request received from client device A 20, and therefore provides some functionality and security that the authorisation server 12 is unable to provide.

The client device A 20 includes a tenant identifier when making the request, so that the trusted authorisation server 32 can check the validity of the request. Specifically, the trusted authorisation server 32 can determine whether the client device A belongs to the tenant having the tenant identifier included in the request. This means that if the client device A has used Company A's tenant identifier, the request may be deemed valid. But if the client device A has used Company B's tenant identifier, the request may be deemed invalid. This is useful because, as explained above, the authorisation server 12 is unable to determine whether a client device has used the tenant identifier of the tenant to which it belongs when making a request.

When the trusted authorisation server 32 determines the client device's request to be valid, the trusted authorisation server 32 itself sends a (second) request for an access token to the third party authorisation server 12 that is linked to the resource server 10, where the second request includes at least one identifier for the client device (step S106). The trusted authorisation server 32 then receives, from the third party authorisation server 12, an access token specifically for the client device which made the (first) request, the access token containing the at least one identifier included in the second request (step S108). The trusted authorisation server 32 then transmits, to the client device A 20, the received access token for use to access the at least one data item stored on and provided by the resource server (step S110).

The client device A 20 then transmits the received access token to the resource server 10 in order to access data A 14 (step S112). The resource server 10 checks the authenticity of the access token, by communicating with the authorisation server 12. That is, the resource server 10 may transmit a request to authenticate the received access token to the authorisation server 12 (step S114), and may receive a response from the authorisation server 12 (step S116). When the response is positive (i.e. the access token is confirmed as being authentic), then the resource server 10 serves the requested data A 14 to the client device A 20 (step S118).

Thus, the intermediate trusted authorisation server 32 gets a request from the client device, validates it using an independent authentication mechanism (that typically already exists for other purposes), contacts the third party authorisation server 12 to obtain an access token for the specific client tenant (and the specific organizational unit (OU) within the client tenant, if applicable), and returns the access token to the client.

The client device A 20 then uses the access token to access the resource server 10 and ask for data. The client device A 20 cannot modify the access token, and advantageously, cannot obtain an access token for other tenants or OUs. This ensures client device A 20 is only able to access data that is has permission to access, where permissions are set by resource/data owners.

The resource server 10 validates the access token, and returns only data that is accessible by the access token, belonging to a specific tenant (and to a specific organizational unit (OU) within the tenant, if applicable).

Advantageously, the present techniques solve the above-mentioned security and privacy issues without adding significant network overhead when accessing multi-tenant resource servers from clients in untrusted environments, by introducing an intermediate trusted authorisation server in a trusted environment, as well as organisational unit awareness to the third party authorisation server and resource server.

Thus, the present techniques provide a system for controlling secure access to data provided by a third party resource server to multiple client devices in a hybrid-cloud environment. The system comprises: a third party resource server 10 storing a plurality of data items 14, 16; a third party authorisation server 12 linked to the third party resource server 10; a plurality of client devices; and a trusted authorisation server 32.

The trusted authorisation server 32 is configured to: receive, from a client device 20 of the plurality of client devices in the hybrid-cloud environment, a first request for an access token to access at least one data item associated with the client device, where the at least one data item is stored on and provided by the third party resource server 10 (step S100); determine whether the received first request is valid (steps S102, S104); transmit, when the received first request is determined to be valid, a second request for an access token to the third party authorisation server, where the second request includes at least one identifier for the client device (step S106); receive, from the third party authorisation server, an access token specifically for the client device which made the first request, the access token containing the at least one identifier included in the second request (step S108); and transmit, to the client device, the received access token for use to access the at least one data item stored on and provided by the resource server (step S110).

The multiple client devices may be arranged in a multi-tenant environment. In a multi-tenant environment, at step S106, once the trusted authorisation server 32 has determined the validity of the first request, the trusted authorisation server 32 transmits a second request for an access token to the third party authorisation server 12. In this multi-tenant environment, the second request includes at least one identifier of the client device 20 which made the first request, which ensures the third party authorisation server 12 issues an access token that can only be used by a client device 20 having the same at least one identifier. In some cases, the second request may simply include a client identifier.

When the multiple client devices are arranged in a multi-tenant environment, each client device may comprise a tenant identifier indicating which tenant the client device belongs to. Therefore, the third party authorisation server 12 may be configured to: receive the second request for an access token from the trusted authorisation server 32, wherein the second request comprises a tenant identifier for the client device that transmitted the first request; and transmit to the trusted authorisation server 32 an access token specifically for the client device with the tenant identifier, the access token containing the tenant identifier included in the second request.

The multiple client devices may be arranged in organisational units within tenants of the multi-tenant environment, as explained above. When the multiple client devices are arranged in organisational units, each client device may comprise an organisational unit identifier indicating which organisational unit the client device belongs to. Thus, the third party authorisation server 12 may be configured to: receive the second request for an access token from the trusted authorisation server 32, wherein the second request comprises an organisational unit identifier for the client device that transmitted the first request; and transmit to the trusted authorisation server 32 an access token specifically for the client device with the organisational unit identifier, the access token containing the organisational unit identifier included in the second request.

The access tokens issued by the third party authorisation server 12 may not have any particular format. For example, systems using OAuth protocols may use any format for the access tokens. Typically, however, an access token is a string that client devices use to make requests to the resource server. The access token issued by the third party authorisation server may contain information about the token type, information about the client device (e.g. the identifier(s) of the client device) and what data is being requested, and a signature which is applied by the third party authorisation server. The signature is used by the resource server to determine the authenticity of access tokens received from client devices. If the signature is missing or is not authentic, then the resource server will not permit the client device to access data. Access tokens may also include an expiry data or time.

Advantageously, in the present techniques, the access tokens issued by the third party authorisation server 12 are only issued when the trusted authorisation server 32 has checked the validity of the first request and the identity of the client device making the first request. This means that the access tokens are specific to the client device that made the first request but crucially, are only issued after the validity and identity checks have been completed (and are positive). This ensures that access tokens are only granted to client devices known to the trusted authorisation server 32, and which are requesting access to data that they are permitted to access.

As explained above, the or each identifier associated with each client device may be stored in a database, and this database may be used by the trusted authorisation server to determine the validity of the first request.

In some cases, the trusted authorisation server 32 may store this database and may have the capability to directly determine the validity of the first request. That is, the database containing the identifiers may be stored by, and used directly by, the trusted authorisation server 32. In this case, the trusted authorisation server 32 may retrieve information from the stored database itself and use this to check the validity of the first request.

Furthermore, the trusted authorisation server 32 may retrieve one or more identifiers from the database for use when transmitting the second request to the third party authorisation server.

In other cases, the system may further comprise an identity server 34 configured to check validity of the received first request using information about the client device. In such cases, the identity server 34 stores the database containing the identifiers, and the trusted authorisation server 32 may request the identity server 34 to check the validity of the first request. The identity server 34 may transmit one of two possible responses to the request back to the trusted authorisation server 32.

One possible response is that the first request is not valid. This may be the response when the first request is received from an unknown client device, which has no corresponding information in the stored database. Similarly, this may be the response when the first request is for data that the client device is not permitted to access, based on the identifier(s) associated with the client device.

Another possible response that the first request is valid. This may be the response when the client device's identity can be verified using the information in the stored database, and when the first request is for data that the client device is permitted to access, based on the identifier(s) associated with the client device. Furthermore, the identity server 34 may transmit one or more client device identifiers from the database to the trusted authorisation server 32, so that the identifiers can be used when transmitting the second request to the third party authorisation server 12.

Thus, the trusted authorisation server 32 may determine whether the received request is valid by: transmitting the received first request to the identity server (step S102); and receiving, from the identity server, a response indicating that the received request is valid and the at least one identifier for the client device (step S104).

The client device 20 which transmitted the first request may be configured to: receive, from the trusted authorisation server 32, an access token (step S110); transmit, to the third party resource server, a request to access at least one data item together with the received access token (step S112); and receive, from the third party resource server, the requested at least one data item (step S118). Firstly, the client device only receives the access token in the case when the first request is determined to be valid. Secondly, the access token is specific to that client device (as it contains the client device identifier(s)), and is specific to the data item(s) specified in the first request. This means the client device is only able to access the data item(s) originally requested in the first request. New requests would need to be made by the client device for any other data item(s).

As noted above, the access token comprises a signature of the third party authorisation server. This signature is used by the third party resource server to determine the authenticity of the access token, prior to serving the requested data item(s). Thus, the third party resource server 10 may be configured to: receive, from the client device 20, a request to access at least one data item together with the access token (step S112); determine whether the request to access at least one data item is authentic; and transmit, to the client device 20, the requested at least one data item when the request is determined to be authentic (step S118). The third party resource server 10 may also perform further checks (itself, or via the third party authorisation server 12) to determine whether the access token is valid. For example, the third party resource server may check whether the access token has not expired.

The third party resource server 10 may determine whether the request to access at least one data item is authentic by: transmitting the received access token to the third party authorisation server 12 (step S114); and receiving, from the third party authorisation server, a response indicating that the received access token is authentic (step S116). The third party authorisation server may check the authenticity of the signature on the access token, for example.

Each data item of the plurality of data items 14, 16 stored by the third party resource server 10 may be tagged with information indicating any one or more of: one or more client devices permitted access; one or more organisational units permitted access; and one or more tenants permitted access. This may help the resource server to determine what data to serve to a client device.

Preferably, the third party resource server 10 transmits the requested at least one data item when the at least one identifier contained in the access token matches the information tagged to the requested at least one data item. In other words, the third party resource server may perform another check before serving any data to the client device. This additional check is to ensure that the client device is allowed to access the requested data item(s). This check cannot be performed by the trusted authorisation server, because the trusted authorisation server is not aware of any data item specific restrictions/permissions. The trusted authorisation server is only able to check whether the client device is making a request for data item(s) associated with the client device, tenant and/or organisational unit. However, a resource owner may have placed additional restrictions on individual data item(s). For example, if a client device is being used by an employee in a Human Resources department of Company A, the trusted authorisation server can check the client device identifier, organisational unit identifier (for the HR department) and/or tenant identifier (for Company A). The resource owner may wish for that employee to have access to data item(s) associated with the department of Company A, but not all data item(s). For example, an HR Manager may not want other members of the HR department to see all employee salary information. Thus, some data item(s) may be further restricted, via tags or metadata appended to the data items stored by the resource server. Such tags/metadata may include these further restrictions. For example, a tag may indicate that access permission is not granted to certain client device identifiers.

Figure 3:
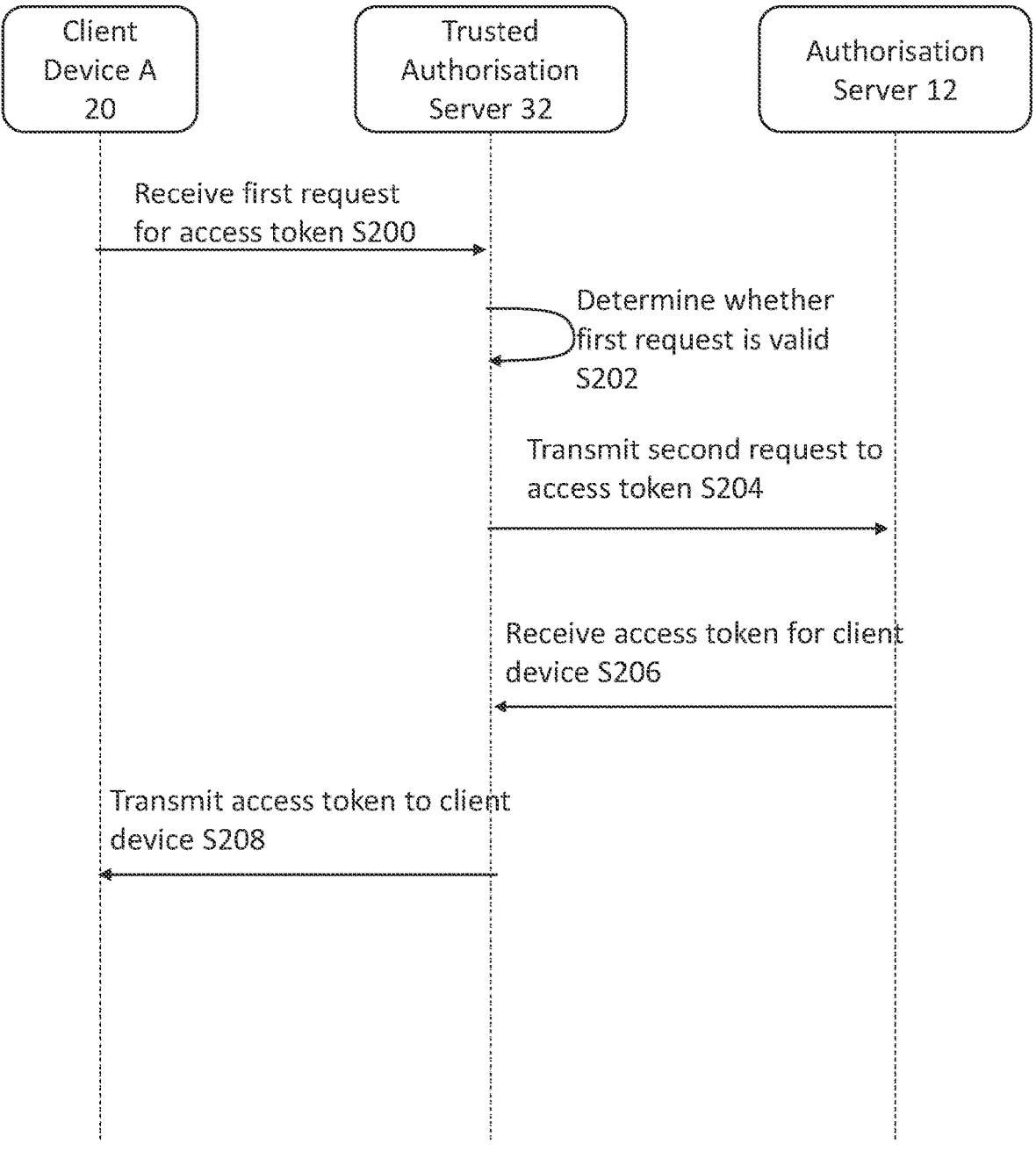
FIG. 3 is a flowchart of example steps performed by a trusted authorisation server.

FIG. 3 is a flowchart of example steps performed by a trusted authorisation server 32 for controlling secure access to data provided by a third party resource server 1- to multiple client devices in the hybrid-cloud environment. The steps comprise: receiving, from a client device in the hybrid-cloud environment, a first request for an access token to access at least one data item associated with the client device, where the at least one data item is stored on and provided by the third party resource server (step S200); determining whether the received first request is valid (step S202); transmitting, when the received first request is determined to be valid, a second request for an access token to a third party authorisation server that is linked to the resource server, where the second request includes at least one identifier for the client device (step S204); receiving, from the third party authorisation server, an access token specifically for the client device which made the first request, the access token containing the at least one identifier included in the second request (step S206); and transmitting, to the client device, the received access token for use to access the at least one data item stored on and provided by the resource server (step S208).

In a multi-tenant environment, the step S200 of receiving the first request from the client device may comprise receiving the first request from a client device associated with a tenant of a plurality of tenants. Thus, for example, the client device may belong to tenant A, and tenants A, B, C and so on, may all use the same third party resource server. In this environment, the step of receiving an access token may comprise receiving an access token specifically for the client device associated with the tenant.

Preferably, therefore, the step S204 of transmitting the second request for an access token to a third party authorisation server may comprise transmitting a tenant identifier for the client device. Thus, the trusted authorisation server may include at least the tenant identifier associated with the client device when sending the second request for an access token. This enables the third party authorisation server to issue an access token that is specifically for the client device, because the access token contains at least the tenant identifier. This is advantageous over the existing techniques because the access token is only issued after the trusted authorisation server has checked the validity of the first request. In other words, if the trusted authorisation server determines that the first request is invalid, the whole process terminates and no access token is issued. The trusted authorisation server only transmits the second request when the first request is valid, and provides the identifier(s) associated with the client device when sending the second request.

In some cases, each tenant may be divided into organisational units (OUs). For example, in the case where Company A is a tenant, Company A may be divided into different organisational units, such as the Human Resources department, IT department, Finance department, Engineering department, Legal department, and so on. Each organisational unit may not be permitted to access other organisational units' data. This means that knowing which organisational unit each client device belongs to is important when checking the validity of the first request and issuing the access token.

Therefore, the step 200 of receiving the first request from a client device associated with a tenant may comprise receiving the first request from a client device in an organisational unit of a plurality of organisational units within the tenant. Similarly, the step S206 of receiving an access token may comprise receiving an access token specifically for the client device in the organisational unit within the tenant.

To ensure that client devices in organisational units are only granted access tokens for data that the organisational unit is permitted to access, the step S204 of transmitting the second request for an access token to a third party authorisation server may comprise transmitting one or more of a tenant identifier and an organisational unit identifier for the client device. This is so that the access token is issued for the specific client device which made the first request.

With respect to step S202, as explained above, the trusted authorisation server may check the validity of the first request in any suitable manner. In one example, the trusted authorisation server 32 uses an identity server 34 to perform the validity check.

Figure 4:
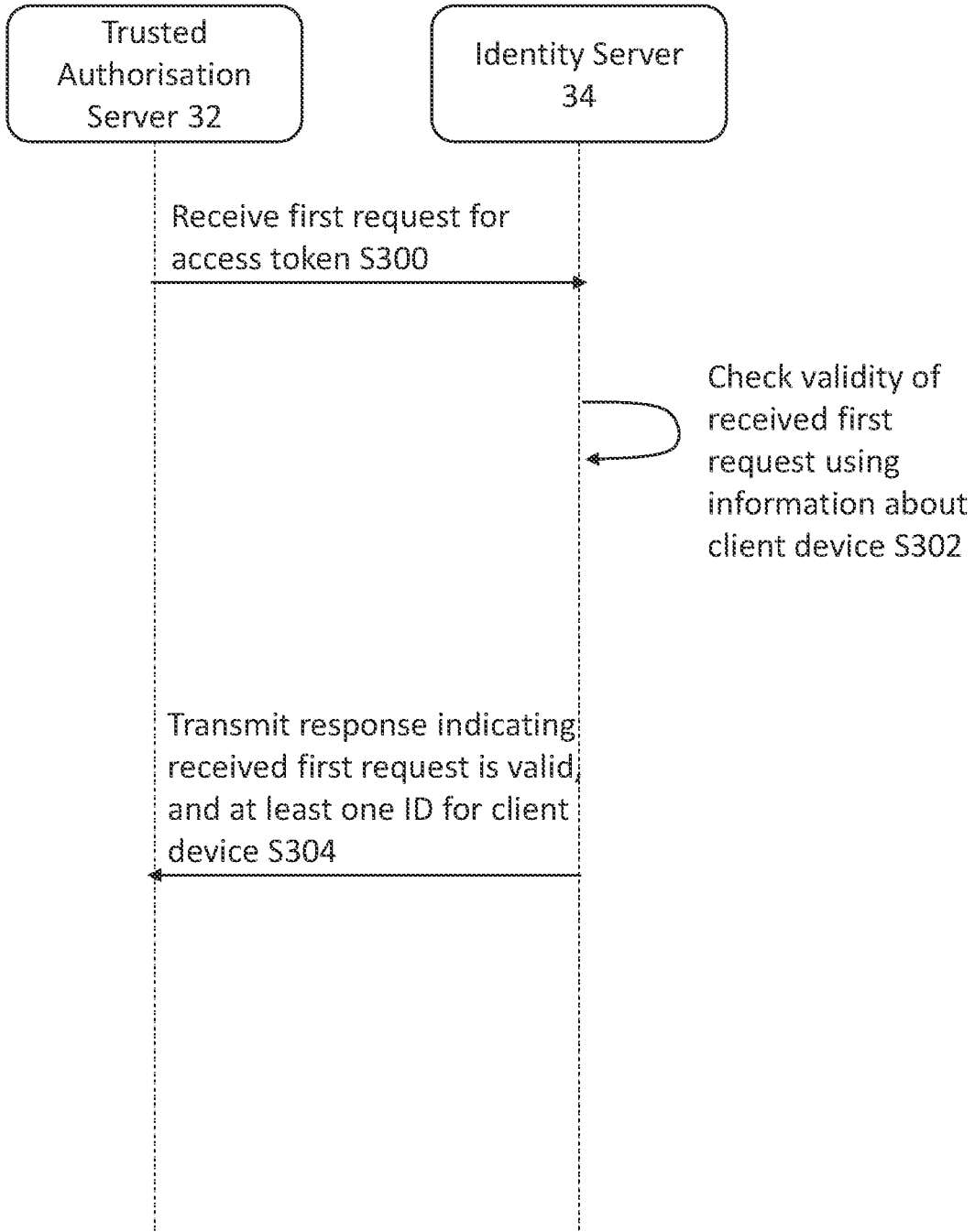
FIG. 4 is a flowchart of example steps performed by an identity server.

FIG. 4 is a flowchart of example steps performed by an identity server. As explained above, the database of identifiers (and public keys) may be stored by a trusted identity server 34, which is linked to the trusted authorisation server 32 and is in the same trusted environment 36. In this case, the identity server 34 may receive, from the trusted authorisation server 32, a request to check the validity of the first request (step S300). This may involve the trusted authorisation server 32 simply forwarding the first request to the identity server 34 to check. The identity server 34 may check the validity of the received first request using information about the client device 20 which sent the first request, where the information is in the database (step S302). The identity server 34 may validate the first request using any suitable method. Examples include using OAuth access token, OAuth access token with OpenID Connect (OIDC) federation, SAML authentication, pre-shared secret, certificate. Such validation methods are typically already used for other purposes between Untrusted Environment and Trusted Environment. It will be understood these are non-exhaustive and non-limiting example techniques for validating the first request at step S302.

The identity server 34 may transmit one of two possible responses to the request back to the trusted authorisation server (step S304).

One possible response is that the first request is not valid. This may be the response when the first request is received from an unknown client device, which has no corresponding information in the stored database. Similarly, this may be the response when the first request is for data that the client device is not permitted to access, based on the identifier(s) associated with the client device.

Another possible response that the first request is valid. This may be the response when the client device's identity can be verified using the information in the stored database, and when the first request is for data that the client device is permitted to access, based on the identifier(s) associated with the client device. Furthermore, at step S304, the identity server may transmit one or more client device identifiers from the database to the trusted authorisation server, so that the identifiers can be used when transmitting the second request to the third party authorisation server.

Thus, referring to FIG. 3, in some cases the step S202 of determining whether the received request is valid may comprise: transmitting the received first request to an identity server, the identity server configured to check validity of the received first request using information about the client device (step S300); and receiving, from the identity server, a response indicating that the received request is valid and the at least one identifier for the client device (step S304).

The at least one identifier for the client device, which is stored in the database, may comprise any one or more of: a client device identifier; a tenant identifier; and an organisational unit identifier. To enable the validity of the first request to be determined, the at least one identifier is associated with the client device in some way. For example, as mentioned above, the association may be via a private-public key-pair. In this example, the public key for each client device may also be stored in the database.

With respect to FIGS. 2, 3 and 4, where reference is made to requesting data stored on the resource server 10, it will be understood that the client device may additionally or alternatively request services or operations from the resource server 10. When a request is for an operation, the response from the resource server 10 may simply be a success/failure indication.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A computer-implemented method, performed by a trusted authorisation server in a hybrid-cloud environment, for controlling secure access to data provided by a third party resource server to multiple client devices in the hybrid-cloud environment, the method comprising:

receiving, from a client device in the hybrid-cloud environment, a first request for an access token to access at least one data item associated with the client device, where the at least one data item is stored on and provided by the third party resource server;

determining whether the received first request is valid by transmitting the received first request to an identity server, the identity server configured to check validity of the received first request using information about the client device; and receiving, from the identity server, a response indicating that the received request is valid and the at least one identifier for the client device;

transmitting, when the received first request is determined to be valid, a second request for an access token to a third party authorisation server that is linked to the resource server, where the second request includes at least one identifier for the client device;

receiving, from the third party authorisation server, an access token specifically for the client device which made the first request, the access token containing the at least one identifier included in the second request; and transmitting, to the client device, the received access token for use to access the at least one data item stored on and provided by the resource server.

2. The method as claimed in claim 1 wherein the method is for controlling secure access to data provided by the third party resource server to multiple client devices in a multi-tenant environment.

3. The method as claimed in claim 2 wherein:

receiving the first request from the client device comprises receiving the first request from a client device associated with a tenant of a plurality of tenants; and receiving an access token comprises receiving an access token specifically for the client device associated with the tenant.

4. The method as claimed in claim 3 wherein:

transmitting the second request for an access token to a third party authorisation server comprises transmitting a tenant identifier for the client device.

5. The method as claimed in claim 3 wherein:

receiving the first request from a client device associated with a tenant comprises receiving the first request from a client device in an organisational unit of a plurality of organisational units within the tenant; and receiving an access token comprises receiving an access token specifically for the client device in the organisational unit within the tenant.

6. The method as claimed in claim 5 wherein:

transmitting the second request for an access token to a third party authorisation server comprises transmitting one or more of: a tenant identifier for the client device, and an organisational unit identifier for the client device.

7. The method as claimed in claim 1 wherein the at least one identifier for the client device comprises any one or more of: a client device identifier; a tenant identifier; and an organisational unit identifier.

8. A system for controlling secure access to data provided by a third party resource server to multiple client devices in a hybrid-cloud environment, the system comprising:

a third party resource server storing a plurality of data items;

a third party authorisation server linked to the third party resource server;

a plurality of client devices; and a trusted authorisation server configured to:

receive, from a client device of the plurality of client devices in the hybrid-cloud environment, a first request for an access token to access at least one data item associated with the client device, where the at least one data item is stored on and provided by the third party resource server;

determine whether the received first request is valid;

transmit, when the received first request is determined to be valid, a second request for an access token to the third party authorisation server, where the second request includes at least one identifier for the client device;

receive, from the third party authorisation server, an access token specifically for the client device which made the first request, the access token containing the at least one identifier included in the second request; and transmit, to the client device, the received access token for use to access the at least one data item stored on and provided by the resource server; and an identity server configured to check validity of the received first request using information about the client device, and wherein the trusted authorisation server determines whether the received request is valid by:

transmitting the received first request to the identity server; and receiving, from the identity server, a response indicating that the received request is valid and the at least one identifier for the client device.

9. The system as claimed in claim 8 wherein the multiple client devices are arranged in a multi-tenant environment.

10. The system as claimed in claim 9, wherein the third party authorisation server is configured to:

receive the second request for an access token from the trusted authorisation server, wherein the second request comprises a tenant identifier for the client device that transmitted the first request; and transmit to the trusted authorisation server an access token specifically for the client device with the tenant identifier, the access token containing the tenant identifier included in the second request.

11. The system as claimed in claim 9, wherein the multiple client devices are arranged in organisational units within tenants of the multi-tenant environment.

12. The system as claimed in claim 11, wherein the third party authorisation server is configured to:

receive the second request for an access token from the trusted authorisation server, wherein the second request comprises an organisational unit identifier for the client device that transmitted the first request; and transmit to the trusted authorisation server an access token specifically for the client device with the organisational unit identifier, the access token containing the organisational unit identifier included in the second request.

13. The system as claimed in claim 8 wherein the client device is configured to:

receive, from the trusted authorisation server, an access token;

transmit, to the third party resource server, a request to access at least one data item together with the received access token; and receive, from the third party resource server, the requested at least one data item.

14. The system as claimed in claim 8 wherein the third party resource server is configured to:

receive, from the client device, a request to access at least one data item together with the access token;

determine whether the request to access at least one data item is authentic; and transmit, to the client device, the requested at least one data item when the request is determined to be authentic.

15. The system as claimed in claim 14 wherein the third party resource server determines whether the request to access at least one data item is authentic by:

transmitting the received access token to the third party authorisation server; and receiving, from the third party authorisation server, a response indicating that the received access token is valid.

16. The system as claimed in claim 8 wherein:

each data item of the plurality of data items stored by the third party resource server is tagged with information indicating any one or more of: one or more client devices permitted access; one or more organisational units permitted access; and one or more tenants permitted access; and the third party resource server transmits the requested at least one data item when the at least one identifier contained in the access token matches the information tagged to the requested at least one data item.

17. The system as claimed in claim 8 wherein the third party resource server is a Microsoft Azure resource server.

18. The system as claimed in claim 8 wherein the third party resource server and third party authorisation server operate using an OAuth protocol.

* * * * *